United States Patent
Kelley (10) Patent No.: US 6,494,350 B2
(45) Date of Patent: *Dec. 17, 2002

(54) SELF-MEASURING DISPENSING CONTAINER

(76) Inventor: Scott Kelley, Box 420446, Houston, TX (US) 77242

(*) Notice: Subject to any disclaimer, the term of this patent is extended or adjusted under 35 U.S.C. 154(b) by 0 days.

This patent is subject to a terminal disclaimer.

(21) Appl. No.: 09/750,939

(22) Filed: Dec. 29, 2000

(65) Prior Publication Data

US 2002/0084291 A1 Jul. 4, 2002

(51) Int. Cl.$^7$ ............................................. G01F 11/26
(52) U.S. Cl. .................... 222/456; 222/442; 222/454
(58) Field of Search ........................... 222/456, 481.5, 222/438, 455, 434, 454, 457, 442, 468, 464.1, 465.1

(56) References Cited

U.S. PATENT DOCUMENTS

| | | | | |
|---|---|---|---|---|
| 900,644 A | * | 10/1908 | Baeyer ........................ 222/455 |
| 957,005 A | * | 5/1910 | Sherman ...................... 222/456 |
| 2,233,996 A | * | 3/1941 | Dent ............................ 221/98 |
| 2,309,234 A | * | 1/1943 | Bonander ..................... 221/98 |
| 2,709,543 A | * | 5/1955 | Appel .......................... 222/438 |
| 3,141,574 A | * | 7/1964 | Donoghue ................... 222/157 |
| 3,178,081 A | | 4/1965 | Adams |
| 3,224,652 A | * | 12/1965 | Ladwig et al. ............... 222/442 |
| 3,347,420 A | * | 10/1967 | Donoghue ................... 222/129 |
| 3,837,542 A | * | 9/1974 | Por ............................. 222/456 |
| 3,877,614 A | | 4/1975 | Murphy |
| 3,948,105 A | * | 4/1976 | Johnson, Jr. .................. 73/427 |
| 3,980,210 A | | 9/1976 | Kligerman |
| 4,061,253 A | * | 12/1977 | Rockefeller ................. 222/442 |
| 4,171,075 A | * | 10/1979 | Gangwisch ................. 222/456 |
| 4,424,921 A | | 1/1984 | Feuerstein et al. |
| 4,651,907 A | | 3/1987 | Thomas |
| 4,684,045 A | | 8/1987 | Su |
| 5,029,736 A | * | 7/1991 | Maruyama et al. .......... 222/455 |
| 5,292,039 A | * | 3/1994 | Neofitou ...................... 222/424 |
| 5,405,055 A | * | 4/1995 | Hester ......................... 222/109 |
| 5,447,245 A | * | 9/1995 | Merhar ........................... 215/6 |
| 5,467,903 A | * | 11/1995 | Sorensen et al. ............ 222/455 |
| 5,480,071 A | * | 1/1996 | Santagiuliana ............... 222/455 |
| 5,497,916 A | * | 3/1996 | Hester ......................... 222/456 |
| 5,810,210 A | | 9/1998 | Kelley et al. |
| 5,971,216 A | * | 10/1999 | Robbins, III ................. 222/158 |
| 6,076,708 A | * | 6/2000 | Ceccarelli et al. ......... 222/189.1 |
| 6,257,462 B1 | * | 7/2001 | Kelley ......................... 222/456 |

* cited by examiner

Primary Examiner—Henry C. Yuen
Assistant Examiner—Frederick Nicolas
(74) Attorney, Agent, or Firm—Bracewell & Patterson, L.L.P.

(57) ABSTRACT

The present invention is a self-measuring container that dispenses only a specific amount of fluid each time fluid is poured from the container. This container has a storage chamber where the fluid initially resides and a measuring/dispensing chamber, below the storage chamber, where the specific amount of the fluid that will be dispensed during the next pouring operation resides. An aperture at one end of the container connects the storage and dispensing chambers. This aperture permits the fluid in the storage chamber to flow into the dispensing chamber. The container dispenses the fluid through an exit channel that extends from the dispensing chamber to the top of the container. The storage chamber bottom serves to separate the storage and dispensing chambers and acts as a barrier during a pouring operation to prevent fluid from flowing from the storage chamber to the dispensing chamber until desired. In another embodiment, the storage and dispensing chamber do not have a common wall, but the dispensing chamber is formed to minimize the draw necessary during the formation process. The measuring chamber may also contain a diaphragm to permit the volume within the chamber to be adjusted.

24 Claims, 13 Drawing Sheets

SELF-MEASURING DISPENSING CONTAINER

FIELD OF INVENTION

This invention relates to an apparatus for containing and dispensing fluid and more particular to a container having an integral measuring device for dispensing a predetermined volume of liquid.

BACKGROUND OF INVENTION

The use of fluid products pervades all aspects of life. There are many types of containers that hold these products. For many applications, the entire contents of a container may be used at one time. For other applications, only a small amount of the fluid product may be required for an application, such as washing detergent, bleach, fabric softener, drain opener, floor wax, cooking oil, lubrication oil, insecticide, etc. In cases where only a small amount of the product is required at any one time, there is usually a need to measure the amount of the product to use in that application. One common measuring means utilizes the container cap as the measuring device. The cap may have a built-in cup with various graduations or "fill lines" representing different fluid volumes. Other containers may have graduations along the side to assist in dispensing a desired amount of fluid. Where such measuring aids are not incorporated into the container itself, one may have to find other means to measure the amount of fluid necessary for a specific application. The extra time and effort needed to find and utilize a suitable measuring device presents added difficulties. The procedure of pouring the fluid from the storage container to a measuring container and then to the container in which the fluid is to be utilized is a tedious and time-consuming process. In addition, because of the variations in the size and shape, sight-measuring aids such as this can yield inaccurate and imprecise results.

There are many different containers that dispense fluid in measured amounts, where the container holds a substantially greater amount of the fluid relative to the dispensed amount. Many of these devices have the capacity to store, measure and dispense fluids without the need for sight measuring. Such characteristics are desirable especially when contact with the fluid could be harmful to humans, such as poisons, bleach, etc. Typically however, prior art devices capable of dispensing a measured volume of fluid are unduly complex in design and manufacture, undependable and expensive. It is this complexity and multi-peice design that prevents prior art devices from being profitable and thus not marketable in today's competitive environment.

Specifically, many such pouring devices have been made which themselves combine the pouring function and the measuring function so that as the pouring operation proceeds, a fixed volume of fluid will be dispensed with each pouring operation. However, many of these devices are bulky and have complicated inner structures. In addition, the complexity of the device make it difficult and expensive to manufacture. Further, many of these devices are undependable and inaccurate when attempts are made to rapidly and successively dispense fluid therefrom in controlled quantities. Therefore, there remains a need for a one step self-measuring container that can reliably dispense a specific amount of fluid while at the same time having a simplified one-piece body structure which facilitates manufacturing.

SUMMARY OF INVENTION

It is an object of the present invention to provide a container that dispenses a specific amount of fluid during each pouring operation.

It is another objective of the present invention to provide a self-measuring dispensing container in which the amount of measured fluid to be dispensed can be adjusted.

It is another objective of this invention to provide a self-measuring dispensing container that is only one piece.

It is a fourth objective of the present invention to provide a container that automatically measures a specific amount of the fluid in the container for pouring.

It is a fifth objective of the present invention to provide such a container that when blow molded, requires a reduced draw ratio.

It is a sixth objective of this invention to provide a such container with the potential for a low pour angle configuration.

It is a seventh objective of this invention to provide such a container with smooth sides for increased effectiveness in labeling.

The present invention is a container that dispenses only a specific amount of a fluid substance each time the fluid is poured from the container. This container has a storage chamber or reservoir where the fluid initially resides and a dispensing chamber, below the storage chamber, where the specific amount of the fluid that will be dispensed during the next pouring operation resides. An aperture at one end of the container connects the storage and dispensing chambers. This aperture permits the fluid in the storage chamber to flow into the dispensing chamber. The container dispenses the substance through an exit channel that extends from the dispensing chamber to the top of the container. A second channel provides a vent to the storage and dispensing chamber. A diaphragm adjacent the dispensing chamber may be incorporated to permit the volume of said chamber, and hence the volume of liquid measured therein, to be adjusted. Additionally, a low draw ratio (depth/width of draw) feature may be included in the bottom of the container to form the dispensing chamber to allow increased ease of manufacturing and to facilitate the changing of the dosing volume at the manufacturing level.

In operation, the container is initially filled with a fluid. In an upright position, the fluid in the storage chamber will flow into the dispensing chamber until the dispensing chamber is full. During a pouring operation, the container is tilted to pour the fluid from the dispensing chamber. The fluid in the dispensing chamber will exit the container through the exit channel. The tilted position of the container and the bottom of the storage chamber prevent any of the fluid in the storage chamber from flowing into the dispensing chamber and through the exit channel. After the pouring operation ends, the container is repositioned to an upright/vertical position. As the tilt angle decreases during the repositioning of the container, the fluid in the storage chamber again begins to flow into the now empty dispensing chamber. The flow of fluid into the dispensing chamber will continue until the dispensing chamber becomes full. The container is then ready for the next pouring operation.

DESCRIPTION OF THE PREFERRED EMBODIMENT

Figure 1:
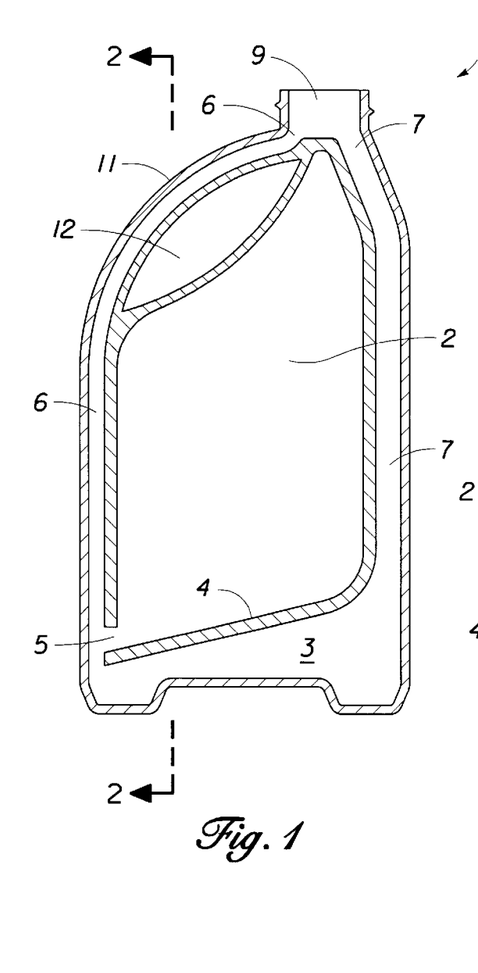
FIG. 1 is a cut-away side view of the preferred embodiment of the present invention.

Referring to FIG. 1, there is shown a conceptual view of the first preferred embodiment of the invention. The container 1 has two chambers; a storage chamber 2 and a measuring/dispensing chamber 3. Initially, container 1 is charged with an amount of fluid to fill both chambers 2, 3, wherein the storage chamber 2 is disposed to receive the greatest quantity of said fluid. Once the storage chamber 2 has initially been filled, residual fluid will flow or remain in the dispensing chamber. This fluid will become part of the initial measured volume dispensed from the container. The storage chamber 2 and the dispensing chamber 3 are positioned vertically with respect to each other. In one embodiment (not shown), the storage chamber bottom 4 encloses separates the two chambers and serves as the top of dispensing chamber 3. An aperture 5 adjacent bottom 4 connects storage chamber 2 and dispensing chamber 3. Aperture 5 permits fluid to flow from the storage chamber 2 to the dispensing chamber 3.

The container has two channels leading into the container. Depending on the filling mode chosen, a primary venting channel 6 permits air to exit or fluid to enter the container during the filling process. Channel 6 also provides venting during a pouring operation, permitting internal and external air pressures to equalize. In this function, air enters the container through this channel as fluid exits the container. Fluid exits the container through exit channel 7 that runs from the dispensing chamber 3 to the top opening 9 of container 1. Venting channel 6 and exit channel 7 terminate at opening 9. To facilitate filling, it may be desirable to provide a small aperture extending from opening 9 into the interior of storage chamber 2. This aperture is for the purpose of venting during the process of filling the storage chamber 2 when container 1 is filled in the upright position. Once container 1 has been filled, this aperture can be seal using any standard means, such as for example, plugging, spin welding, ultra sonic sealing, etc. Otherwise, the aperture can be left in place. However, due to its small size, only an insignificant amount of fluid will drip therefrom during the pouring mode. Alternate processes for filling container 1 can also be used. For example, the container may be pressure filled in an inverted position utilizing primary vent 6 for fluid introduction and utilizing exit channel 7 for venting. Alternatively, if filled upright, the primary vent tube 6 may extend only partially down along the side of container 1. This will allow less air to be trapped in the top portion of the container during filling. If desired, air can also be evacuated from the container before filling. When venting an embodiment with substantially separate venting and pouring channels, the vent may be no more than a simple aperture. In one embodiment, the primary venting channel 6 may extend through a container handle 11 used to carry the container and to pour liquid from the container. As shown, the handle 11 may be shaped such that there is clearance area 12 under the handle to allow a person to grip the handle.

Figure 2:
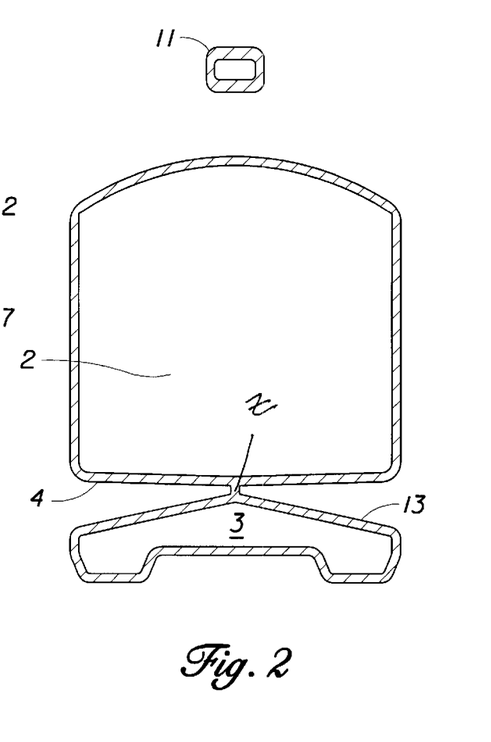
FIG. 2 is a isolated sectional view of the storage and dispensing chambers.
Figure 4:
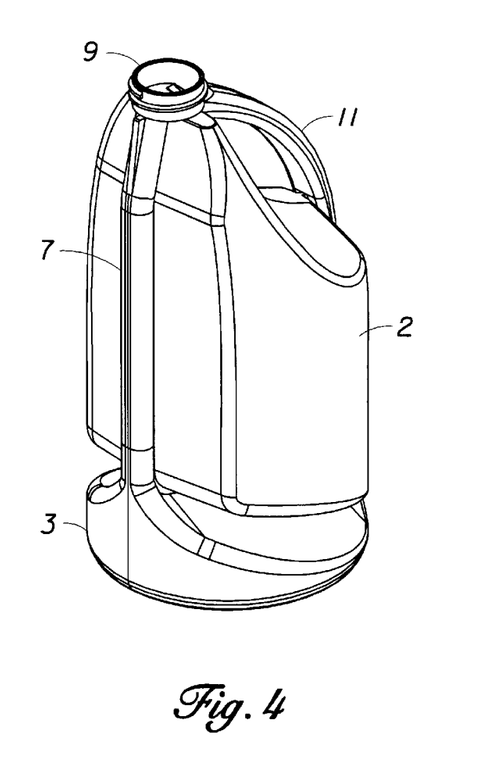
FIG. 4 is a elevation view of the front of the container of the present invention.
Figure 7:
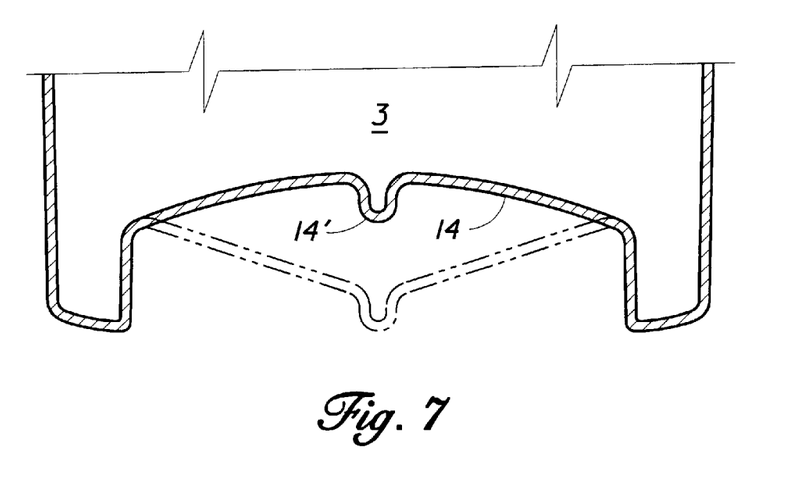
FIG. 7 is a cut away side view of the adjustment diaphragm located in the wall of the measuring and dispensing chamber.

FIG. 2 shows an isolated sectional view of the storage chamber 2 and dispensing chamber 3. Both the of the are completely enclosed except for the connecting aperture 5. As shown in this preferred embodiment of FIG. 4, the two chamber do not share a common side. The storage chamber has a bottom 4 that is completely separate from the top 13 of dispensing chamber 3. Although, the chambers in this embodiment do not share a common side, the invention can operate as design if the chambers did share a common side. The advantage of distinct sides is that this design permits the chamber volume to be precisely adjusted during manufacture and to facilitate one piece molding. The dispensing chamber is design such that only a defined volume can fit in the chamber. This defined volume being the specific amount dispensed during each pouring operation. The design of FIG. 4 shows the possibility of fluid being stored in the exit channel, however, because of the small size of the channel, only minimal amounts of fluid be present in the channel. The dispensing chamber can also contain a diaphragm 14 in the bottom of the chamber as shown in FIG. 7. This diaphragm 14 can be adjusted as desired to change the volume of the dispensing chamber and thus change the amount of fluid dispense with each pouring operation. In the embodiment shown, diaphragm 14 is provided with a grip 14' to permit ease in adjustment. Although the volume control mechanism has been described as a diaphragm, those skilled in the art will understand that any configuration for adjusting the volume within measuring chamber 3 can be used with the invention.

Figure 3:
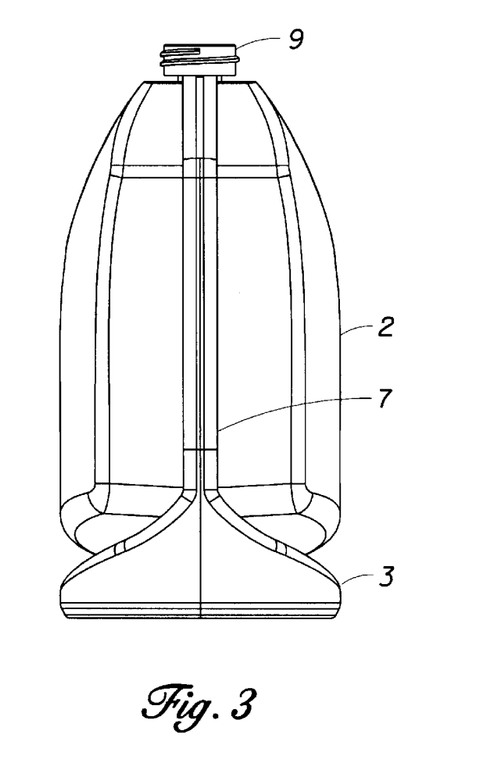
FIG. 3 is a front view of the present invention.

FIG. 3 shows a front view of the present invention. During a pouring operation, fluid exits the dispensing chamber 3, travels through the exit channel 7 and exits the container through the top opening 9. FIG. 4 gives a full frontal view of the container and shows the relationship between the storage chamber 2, the dispensing 3, the exit channel 7 and the top 9.

Figures 5, 6:
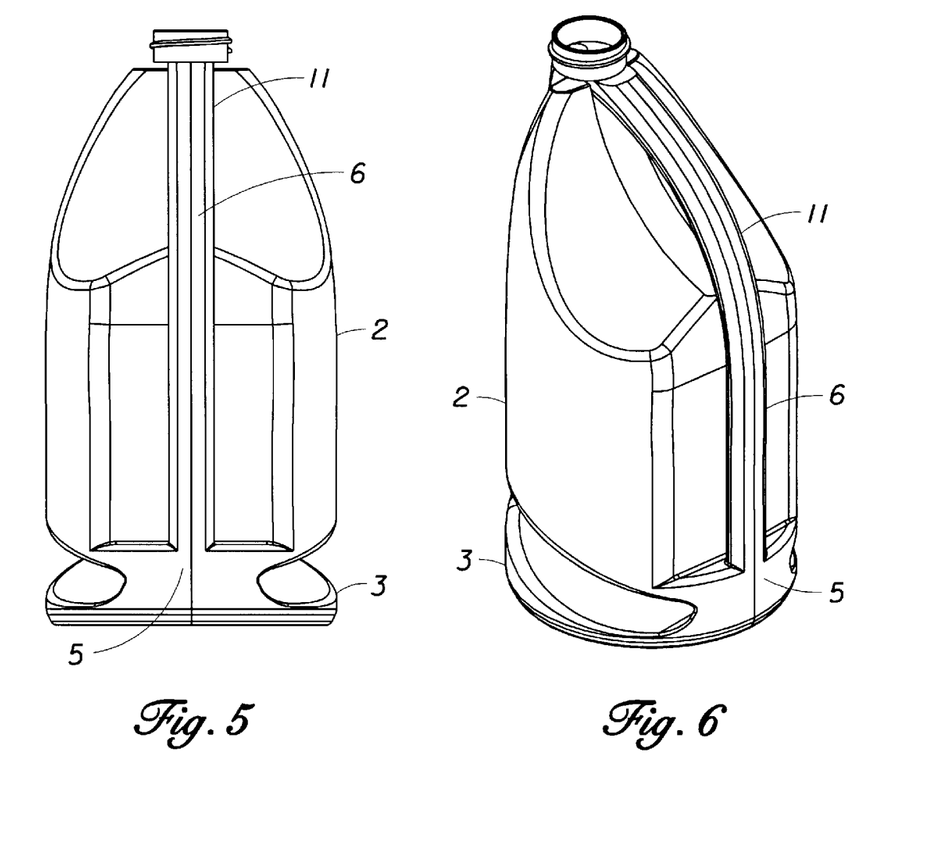
FIG. 5 is a back view of the present invention.
FIG. 6 is a elevation view of the back of the container of the present invention.

FIG. 5 shows back view of the present invention. This view illustrates the external position of handle 11 in which is located vent tube 6. Air will enter the container through top opening 9, travel through the primary vent channel 6, and into the dispensing chamber 3 and storage chamber 2. FIG. 6 gives a full rear view of the container and shows the relationship between storage chamber 2 and dispensing chamber 3 In addition, although not specifically shown, FIG.6 illustrates the general area in which vent channel 6 and connecting aperture 5 are located within container 1.

Figure 8:
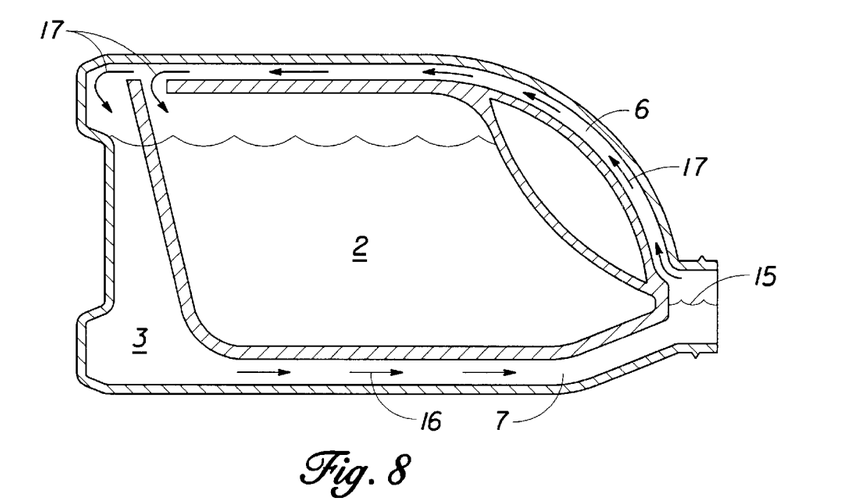
FIG. 8 is a cut away side view of the container of the present invention in a tilted position.

FIG. 8 illustrates the container of the present invention filled with fluid 16 and disposed in a fluid dispensing position. As the tilt begins, fluid 16 in the dispensing chamber flows through the exit channel 7. Initially, in an upright position (see FIG. 9), fluid flow between storage chamber 2 and dispensing chamber 3 through aperture 5 is uninhibited. However, as the tilt angle increases, flow between chamber 2 and chamber 3 is cut off. As the fluid 16 contained in chamber 3 flows through exit channel 7, air 17 enters the container through channel 6. The air flows through the vent channel 6 and enters the storage chamber 2 and the dispensing chamber 3. Eventually, as exit channel 7 is tilted to a position substantially parallel with the horizontal, fluid 16 in the dispensing chamber 3 completely flows out of the container. The fluid still in the storage chamber 2 is prevented from flowing into the dispensing chamber 3 since aperture 5 is above the surface level of the fluid contained in chambers 2 and 3.

Figure 9:
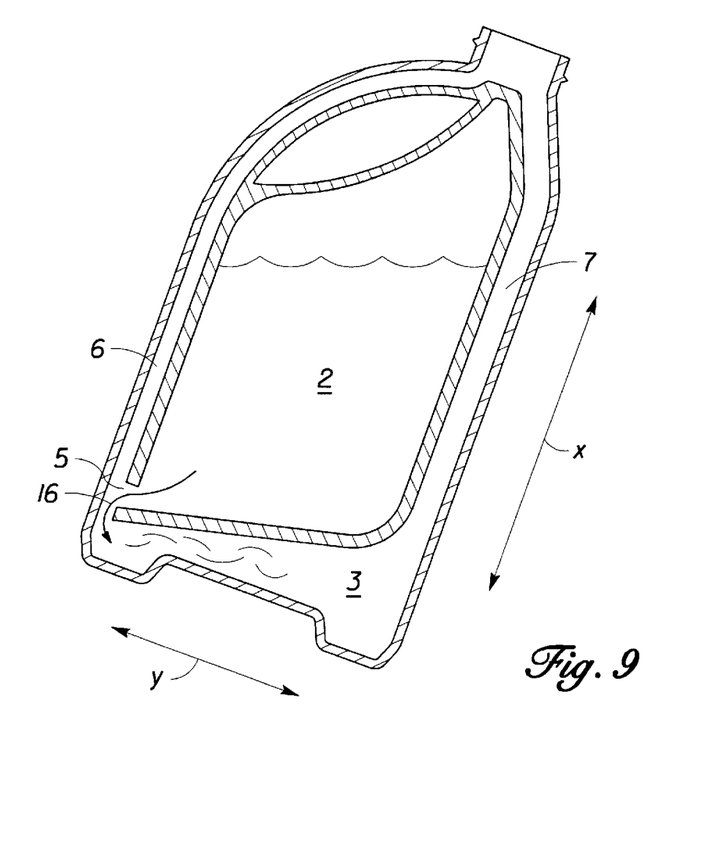
FIG. 9 is a cut away side view of the container of the present invention illustrating fluid flow when the container is in an upright position.

FIG. 9 illustrates fluid flow in container 1 after the pouring operation has been completed and the container is returned to its upright position. As the tilt angle of the container decreases, the fluid in the storage chamber 2 will begin to flow into the connecting channel 5 and into the dispensing chamber 3. The fluid 16 entering the dispensing chamber 3 will force any air in that chamber into the exit channel 7 or the vent channel 6. Fluid will continue to flow into the dispensing chamber into the chamber volume is full of fluid and the fluid pressure equalizes in the container. When the container is in the upright position, the dispensing chamber will refill with fluid. This volume of fluid will be the amount of fluid dispensed during the next pouring operation.

An additional advantage of the container of the present invention is that it can be constructed in a single piece. Although there are a number of methods known in the art to accomplish such construction, one preferred method is blow molding.

Figure 10:
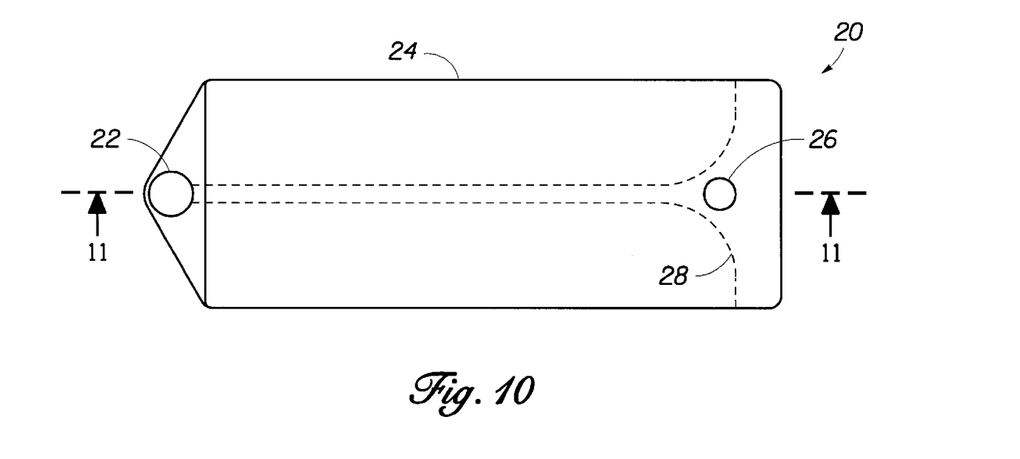
FIG. 10 is a top view of an embodiment of the container wherein the container is provided with a low center of gravity.
Figure 11:
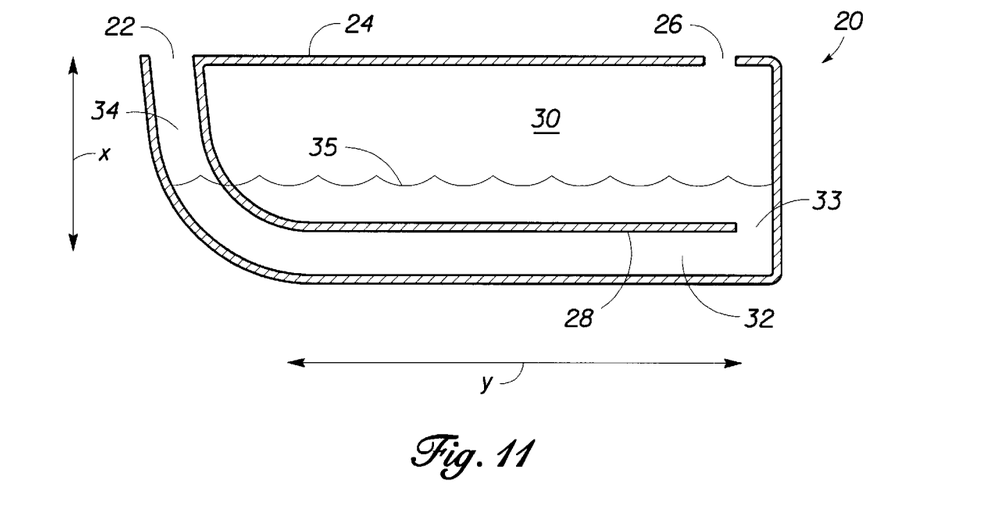
FIG. 11 is a cut away side view of the container of FIG. 10.

FIGS. 10 and 11 illustrate another embodiment of the invention wherein the container is provided with a low profile for use with heavier fluids, such as lubricating fluids. The low profile results in a lower center of gravity. In addition, the low profile obviates the need for a second air vent channel. Specifically in FIG. 10, a substantially rectangular container 20 is provided with a pour spout 22 in a top surface 24. Also provided in top surface 24 is a vent aperture 26. Shown in phantom is wall 28 which can also be seen in FIG. 11. FIG. 11 more clearly shows the first storage chamber 30 below which is located the second measuring chamber 32. An aperture 33 is provided to permit fluid flow between first chamber 30 and second chamber 32. An exit channel 34 is provided between second chamber 32 and spout 22. Wall 28 may be disposed to define channel 34. In addition, wall 28 may be utilized to separate and define first chamber 30 and second chamber 32. Aperture 33 is positioned to be at a point opposite pour spout 22 so that as container 20 is tilted to produce fluid flow from pour spout 22, aperture 33 is raised above the fluid surface level 35 of both first chamber 30 and second chamber 32, preventing fluid flow therebetween. In this manner, only fluid in second measuring chamber 32 can be poured from container 20. Once a pouring operation is complete and container 20 is returned to a substantially upright or untilted position (illustrated in FIG. 11), the fluid surface level 35 of the fluid in first chamber 30 rises above aperture 33 to permit fluid flow into measuring chamber 32.

In the embodiment shown in FIGS. 10 and 11, the low profile of container 20 can be characterized by a vertical length X and an horizontal length Y. As can be seen in FIG. 11, vertical length X is substantially equivalent to the length of channel 34, while horizontal length Y is substantially equivalent to the length of second chamber 32. Because of the large surface area of top surface 24, pour spout 22 and vent aperture 26 can be located apart from one another, preferably at distal points from one another on surface 24. In so doing, the possibility of fluid escaping though vent aperture 26 is diminished. Those skilled in the art will understand that in the other embodiments of the invention taught above, the comparatively small top surface of upright containers, i.e., containers with tall profiles, necessitates positioning of the exit channel adjacent the vent channel. However, as the length of the container increases, the possible separation distance between the vent channel and the exit channel increases. In other words, as the horizontal length Y of container 20 increases, the need for a vent channel as shown in the other embodiments of the invention decreases. Rather, a simple vent aperture such as vent aperture 26 may be utilized. Likewise, as the horizontal length of Y increases, the volume of second chamber 32 increases and the significance of any residual fluid in exit channel 34 decreases. In other words, as the X:Y ratio decreases, pour accuracy increases and permits faster pour due to a shorter exit channel length.

Figures 12, 13:
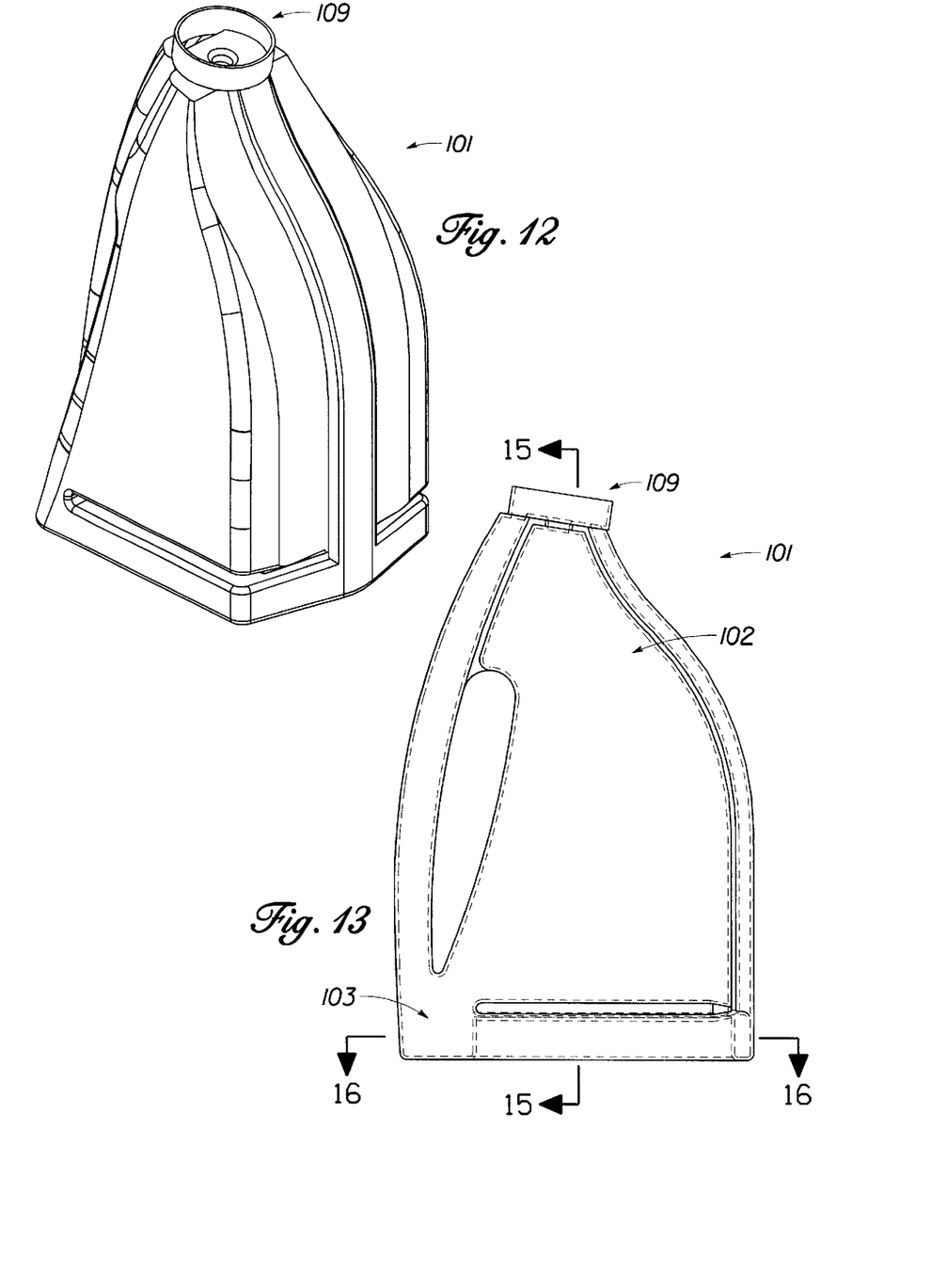
FIG. 12 is a front perspective view of the front of another embodiment of the present invention.
FIG. 13 is a side view of the container in FIG. 12.
Figures 14, 15:
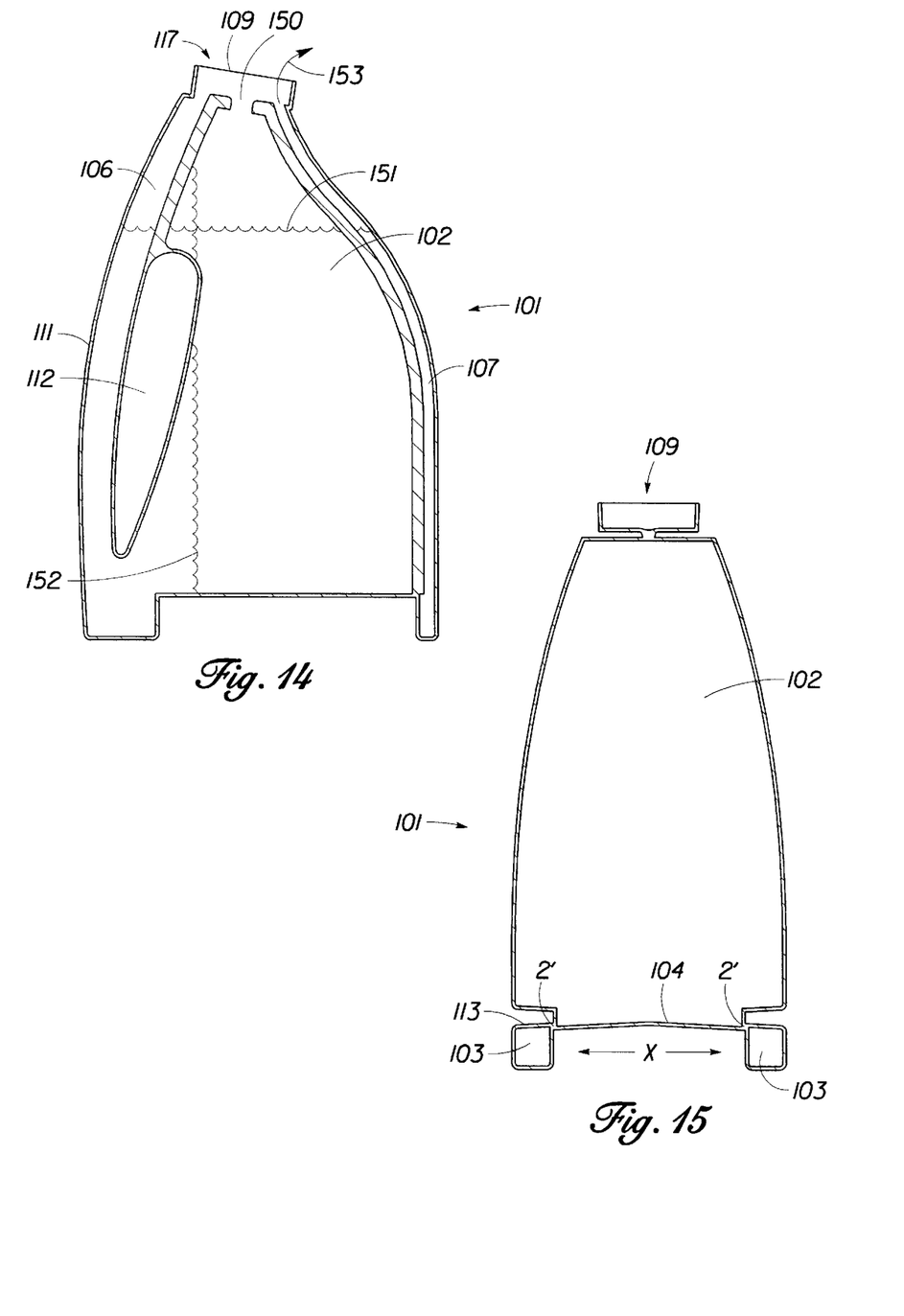
FIG. 14 is a cut-away side view of the container in FIG. 12.
FIG. 15 is a cut-away front view of the container in FIG. 12.
Figure 16:
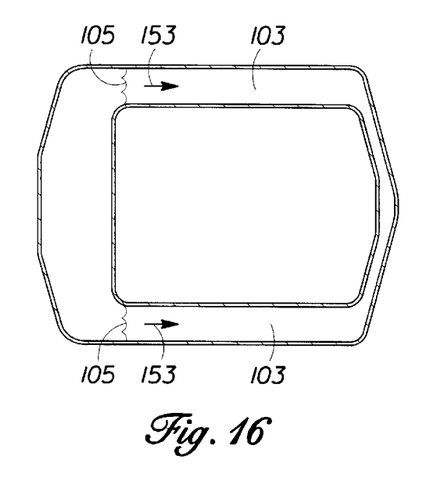
FIG. 16 is a isolated sectional view of the dispensing chambers of the container in FIG. 12.
Figure 17:
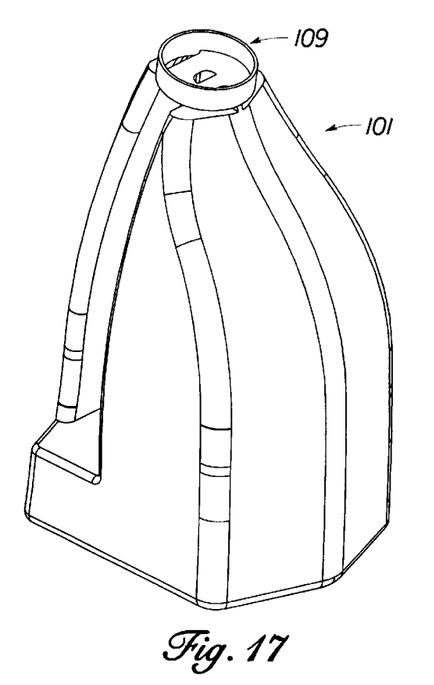
FIG. 17 is a front perspective view of an embodiment of the container.
Figure 18:
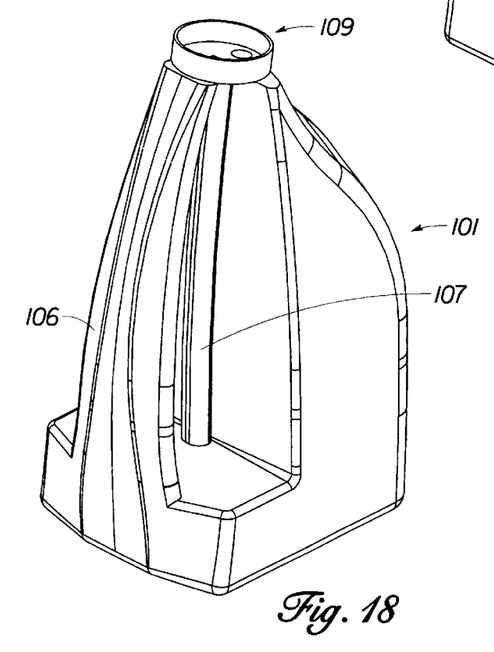
FIG. 18 is a rear perspective view of the container shown in FIG. 17.

Referring to FIGS. 13 and 14, there is shown a side view of another preferred embodiment of the present invention illustrated in FIG. 12. The container 101 has two chambers; a storage chamber 102 and a measuring/dispensing chamber 103, as shown in FIG. 15. Initially, container 101 is charged with an amount of fluid to fill both chambers 102, 103, wherein the storage chamber 102 is disposed to receive the greatest quantity of said fluid. Once the storage chamber 103 has initially been filled, residual fluid will flow or remain in the dispensing chamber. This fluid will become part of the initial measured volume dispensed from the container. The storage chamber 102 and the dispensing chamber 103 are positioned vertically with respect to each other. A portion of the storage chamber bottom 104 encloses and separates the two chambers 102, 103 and serves as the top of dispensing chamber 103. An aperture 105 adjacent bottom 104 connects storage chamber 102 and dispensing chamber 103. As shown in FIG. 16, aperture 105 permits fluid to flow from the storage chamber 102 to the dispensing chamber 103.

The container has two channels leading into the container. Depending on the filling mode chosen, a primary venting channel 106 permits air to exit or fluid to enter the container during the filling process. Channel 106 also provides venting during a pouring operation, permitting internal and external air pressures to equalize. In this function, air enters the container through this channel as fluid exits the container. Fluid exits the container through exit channel 107 that runs from the dispensing chamber 103 to the top opening 109 of container 101. Venting channel 106 and exit channel 107 terminate at opening 109. To facilitate filling, it may be desirable to provide an aperture 150 extending from opening 109 into the interior of storage chamber 102. Once container 101 has been filled, this aperture can be sealed using any standard means, for example, plugging, spin welding, ultra sonic sealing, etc. Alternatively, the aperture may be left in place. Any suitable process for filling container 101 may also be used. For example, the container may be pressure filled in an inverted position utilizing primary vent 106 for fluid introduction and utilizing exit channel 107 for venting. Alternatively, if filled upright, the primary vent tube 106 may extend only partially down along the side of container 101. This will allow less air to be trapped in the top portion of the container during filling. If desired, air can also be evacuated from the container before filling. When venting an embodiment with substantially separate venting and pouring channels, the vent may be no more than a simple aperture. In one embodiment, the primary venting channel 106 may extend through a container handle 111 used to carry the container and to pour fluid from the container. As shown, the handle 111 may be shaped such that there is clearance area 112 under the handle to allow a person to grip the handle.

FIG. 15 shows a front sectional view of the storage chamber 102 and dispensing chambers 103. Both are completely closed to each other except for the connecting apertures 105 (FIG. 16). As may be seen, the two chambers 102, 103 do not share a common side. The storage chamber 102 has a bottom 104 that is substantially separate from the top 113 of dispensing chamber 103. Although, the chambers in this embodiment do not share a common side, the invention can operate as designed if the chambers did share a common side. The advantage of distinct sides is that this design permits the chamber volume to be precisely adjusted during manufacture and to facilitate one piece molding. Specifically the distance, indicated as "X", can be easily changed to adjust the dispense volume in manufacture without affecting the overall bottle size or increasing the draw depth of the feature. Those skilled in the art will realize that another advantage of the low draw ratio feature described is that it allows large, thin walled containers to be manufactured, whereas without this feature a thicker wall would be required. This, in turn, would make it much more difficult to form the body of container 101 as a one-piece integral structure.

More specifically, in the first embodiment there is a very deep draw from the sides into the bottle to the pinch off point Z between the storage and measuring chambers (see FIG. 2). The extent of this draw greatly stretches the formation material. In the presently described embodiment, however, while the draw is still from the side, it is not as far (or deep) to the pinch off point Z. In other words, the depth of draw from one side to pinch off point Z is much smaller. This also permits a draw from the bottom of the container. In any event, the dispensing chambers are designed such that only a defined volume can fit in the chambers. This defined volume being the specific amount dispensed during each pouring operation. FIG. 14 shows a container wherein fluid may be stored in the exit channel. However, because of the small size of the channel, only minimal amounts of fluid may be present in the channel.

FIG. 15 shows a cut away front view of the present invention. During a pouring operation, fluid exits the dispensing chambers 103, travels through the exit channel 107 and exits the container through the top opening 109.

FIG. 14 shows a cut away side view of the present invention. This view illustrates the external position of handle 111 in which vent tube 106 is located. Air will enter the container through top opening 109, travel through the primary vent channel 106, and into the dispensing chamber 103 and storage chamber 102. In addition, although not specifically shown, FIGS. 14 and 16 illustrate the general area in which vent channel 106 and connecting aperture 105 are located within container 101.

Fluid line 151 illustrates fluid level when the container of the present invention filled with fluid and disposed in a resting position. As the tilt begins, fluid in the dispensing chamber 103 flows through the exit channel 107. Initially, in an upright position, fluid flow between storage chamber 102 and dispensing chamber 103 through aperture 105 is uninhibited. However, as the tilt angle increases, flow between chamber 102 and chamber 103 is cut off as described below. Fluid level when container 101 is in a powering position is illustrated by fluid line 152. As the fluid 153 contained in chamber 103 flows through exit channel 107, air 117 enters the container through channel 106. The air flows through the vent channel 106 and enters the storage chamber 102 and the dispensing chamber 103. Eventually, as exit channel 107 is tilted to a position substantially parallel with the horizontal, fluid 152 in the dispensing chamber 103 completely flows out of the container. The fluid still in the storage chamber 102 is prevented from flowing into the dispensing chamber 103 since aperture 105 is above the surface level of the fluid, shown by fluid line 152, contained in the chamber 102. Fluid does not flow or flows an insignificant amount through aperture 150 because it is sealed as described previously or is a very small aperture.

Figures 19, 20:
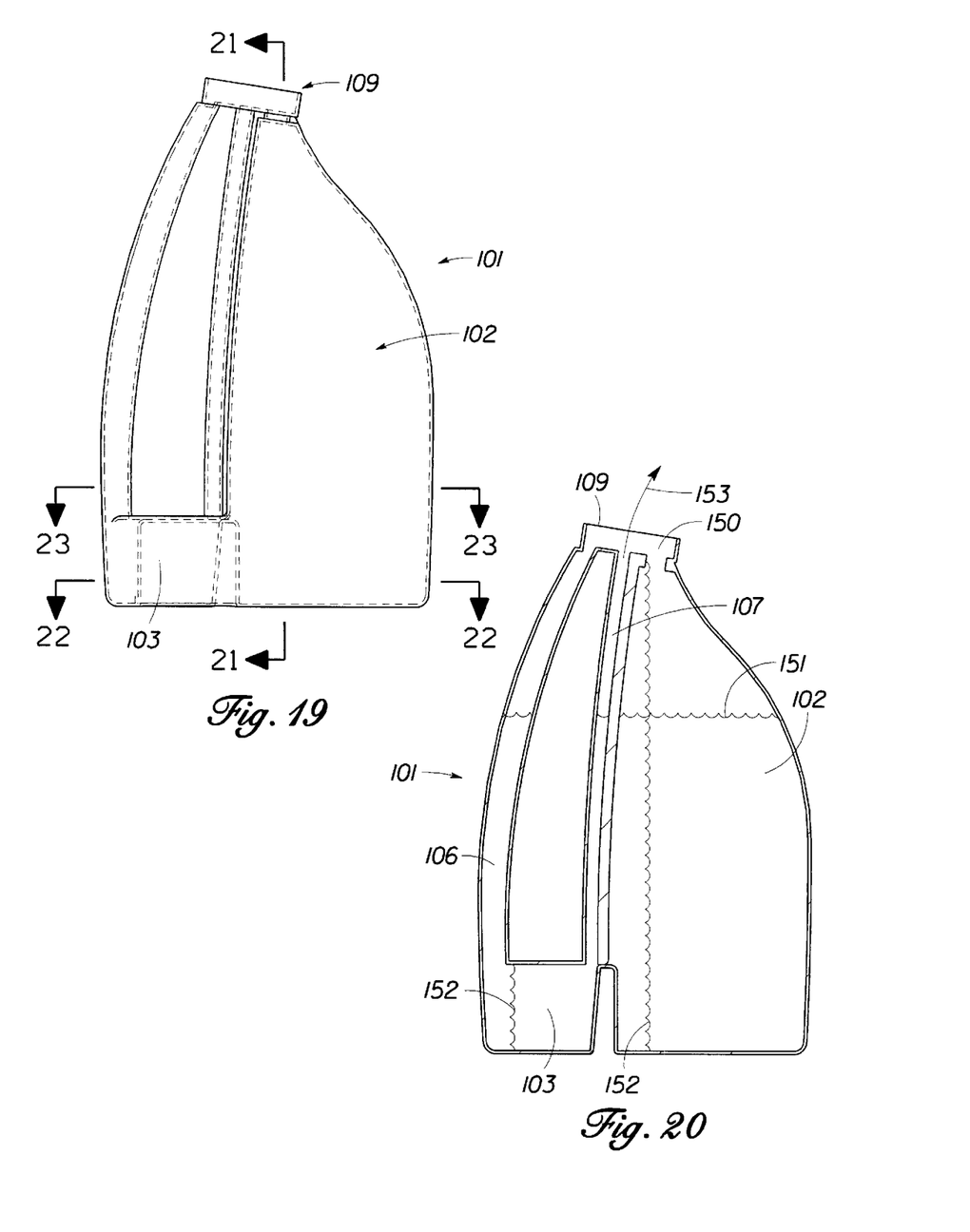
FIG. 19 is a side view of the container in FIG. 18.
FIG. 20 is a cut-away side view of the container in FIG. 18.
Figure 21:
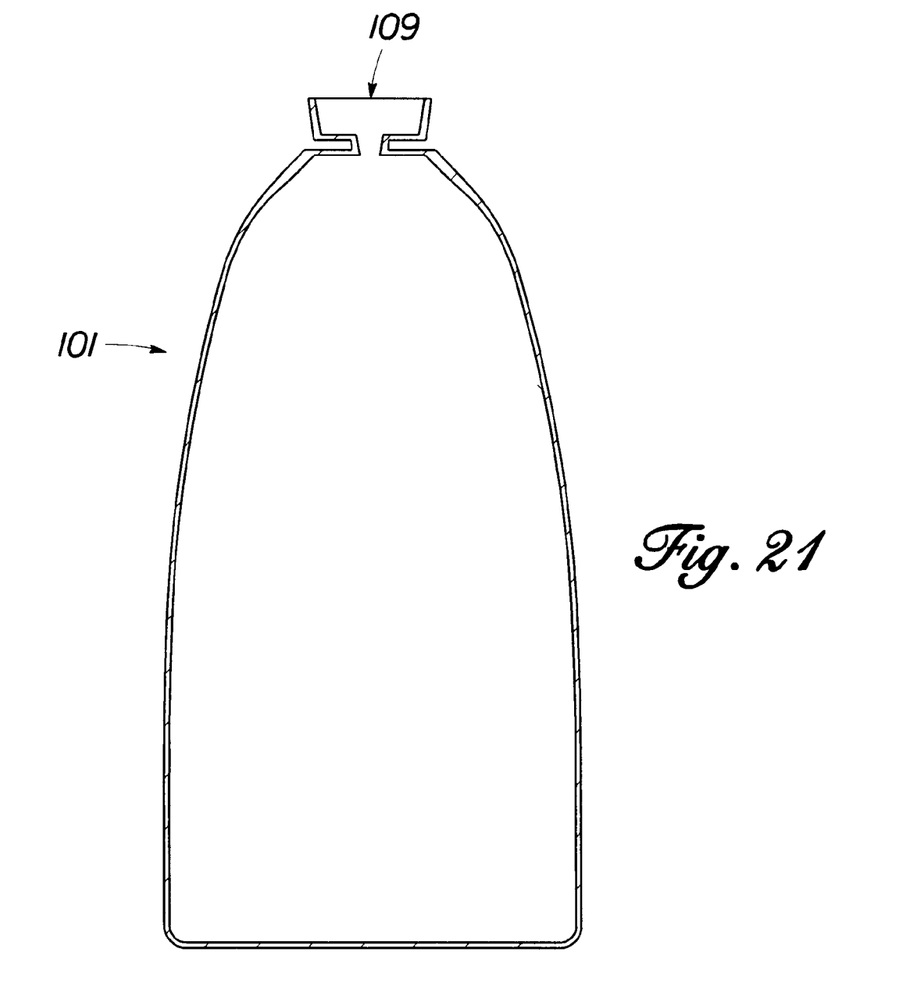
FIG. 21 is a cut-away front view of the container in FIG. 18.
Figure 22:
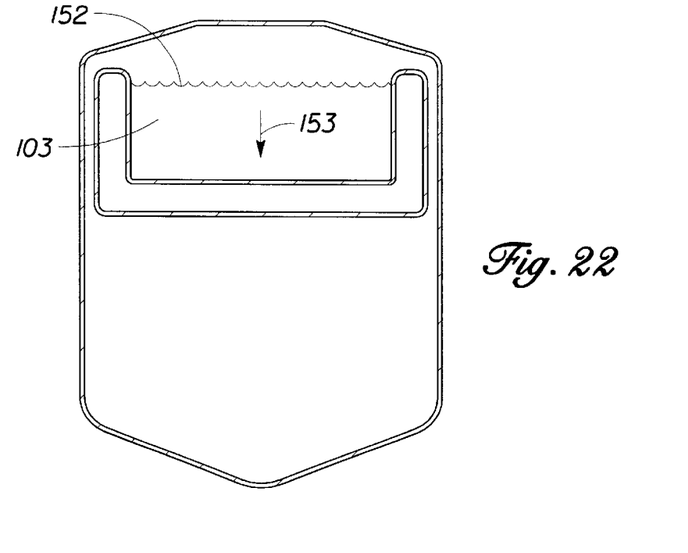
FIG. 22 is a isolated sectional view showing the dispensing chamber of the container in FIG. 18.
Figure 23:
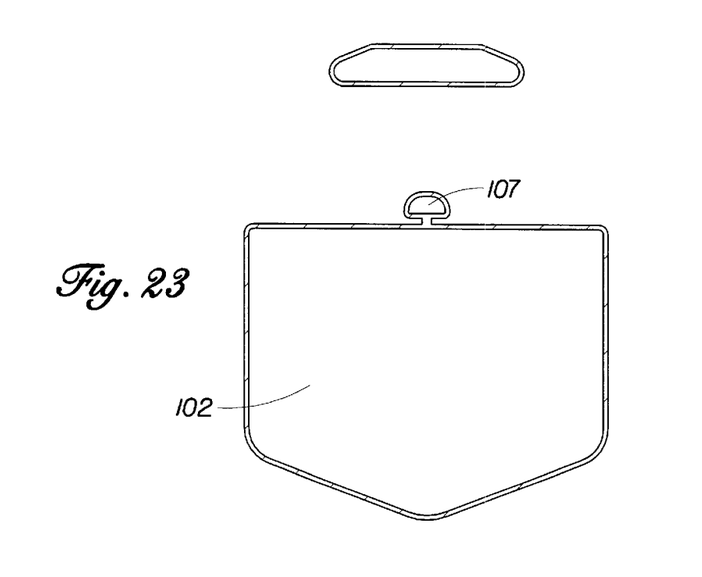
FIG. 23 is a isolated sectional view of the storage chamber, vent and exit channels of the container in FIG. 18.

FIG. 20 illustrates fluid flow in container 101 after the pouring operation has been completed and the container is returned to its upright position. As the tilt angle of the container decreases, the fluid in the storage chamber 102 will begin to flow into the apertures 105 and into the dispensing chamber 103. The fluid 152 entering the dispensing chamber 103 will force any air in that chamber into the exit channel 107 or the vent channel 106. Fluid will continue to flow into the dispensing chamber until the chamber volume is full of fluid and the fluid pressure equalizes in the container. When the container is in the upright position, the dispensing container will refill with fluid. This volume of fluid will be the amount of fluid dispensed during the next pouring operation.

An additional advantage of the container of the present invention is that it can be constructed in a single piece. Although any suitable method may be used to accomplish such construction, one preferred method is blow molding.

FIGS. 17–23 illustrate an embodiment of the invention wherein the dispensing chamber is formed substantially from the under side of the container. This is desirable from the standpoint of achieving a low draw ratio with associated advantages as previously discussed and additionally it omits the necessity of features formed in the side walls that would partially form a dispensing chamber(s). This is highly advantageous from a retail and marketing standpoint because it allows more flexibility and a larger area for labeling.

FIG. 20 illustrates a container whereby the exit tube 107 is on the same side as the vent tube 106. This offers the potential for a lower pouring angle because the exit tube 107 can be substantially straight and still independently accommodate a relatively large storage chamber 102.

Figures 24, 25:
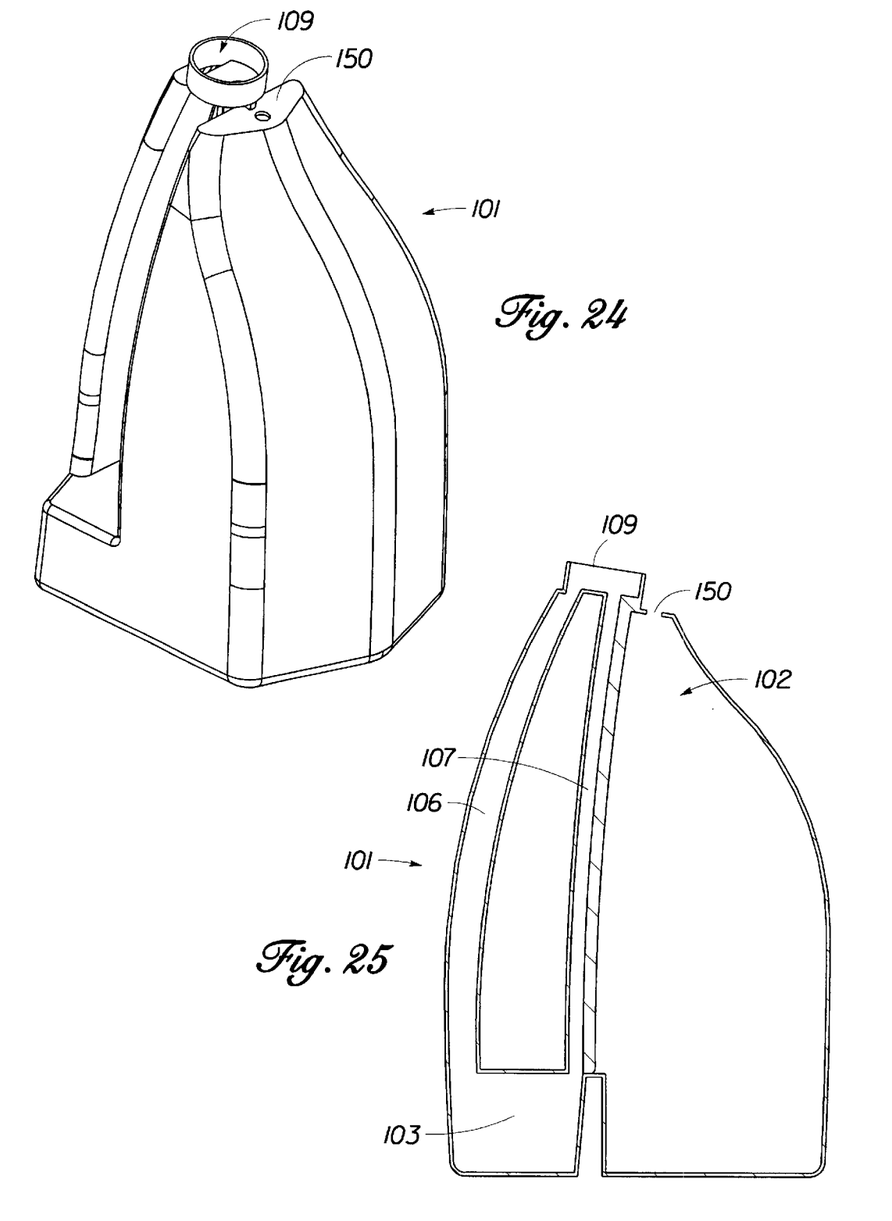
FIG. 24 is a front perspective view of the front of the container of a fifth embodiment.
FIG. 25 is a cut-away side view of the container of FIG. 24.

FIGS. 24 and 25 illustrate a container whereby the sealable aperture 150 is placed outside of opening 109. This would be beneficial if it becomes desirable to use a small opening 109 or if the container needs to be filled independently of opening 109.

FIG. 20 shows a narrow feature that separates the storage chamber from the dispensing chamber, however this feature can extended as far as desired into the storage chamber to effectively empty the container on the last dispensing action. Alternatively, the entire floor of the storage chamber can be raised as desired for the same result.

The apparatus of this invention provides significant advantages over the current art. The invention has been described in connection with its preferred embodiments. However, it is not limited thereto. Changes, variations and modifications to the basic design may be made without departing from the inventive concepts in this invention. In addition, these changes, variations and modifications would be obvious to those skilled in the art having the benefit of the foregoing teachings. All such changes, variations and modifications are intended to be within the scope of this invention, which is limited only by the following claims.

What is claimed is:

1. A container for pre-measuring an amount of fluid to be poured from said container, said container movable between a first storage position in which the container is substantially upright to a second pouring position in which the container is substantially horizontal, said container comprising:
   a) a storage chamber for receiving and storing a volume of fluid, said storage chamber having a top portion, at least one side wall, and a bottom, said bottom having an opening therein; and
   b) a measuring chamber for measuring a specific volume of fluid to be dispensed from said container, said measuring chamber having at least a top and a bottom and at least one side wall, said measuring chamber being separate from said storage chamber but in fluid communication with said storage chamber via the opening through which fluid exits said storage chamber;
   c) at least one outer container side wall and at least one outer container bottom wall;
   d) a container top opening located adjacent the top portion of the storage chamber;
   e) a first fluid channel, said fluid channel extending along said storage chamber side wall from a single spout opening to the measuring chamber;
   f) a first draw feature formed in at least one of the outer container side walls, said draw feature extending inwardly from said outer container side wall so as to define a separation between said storage chamber and said measuring chamber; and
   g) wherein said container is formed of a single piece of integrally molded material.

2. The container of claim 1 wherein said draw feature extends from said outer container side wall to form a portion of said storage chamber bottom.

3. The container of claim 1 wherein said container has a second channel extending from said container top opening towards said measuring chamber.

4. The container of claim 3 wherein said first and second channels are tubes.

5. The container of claim 3 further comprising a handle.

6. The container of claim 5 wherein said second channel extends through said handle.

7. The container of claim 1 wherein the draw feature extends from said outer container bottom wall to form a portion of said measuring chamber side wall.

8. The container of claim 7 wherein said draw feature extends so as to at least partially abut the storage chamber side wall to inhibit fluid communication between said measuring chamber and said storage chamber except via said opening.

9. The container of claim 1 wherein said storage chamber top portion has a sealable opening.

10. The container of claim 3 wherein said second channel is sealable.

11. The container of claim 2 wherein said draw feature also forms a portion of said measuring chamber top.

12. The container of claim 2 further containing a second draw feature, wherein said second draw feature extends from said outer container bottom wall to form a portion of said measuring chamber side wall.

13. The container of claim 7, wherein said draw feature also forms a portion of said storage chamber wall.

14. A self-measuring container having a first storage position in which the container is substantially upright and a second pouring position in which the container is substantially horizontal, said container comprising:
   a) a first means for storing a volume of fluid in said container, said first storing means having a top portion, at least one side wall and a bottom;
   b) a second means for measuring a specific amount of fluid to be dispensed from said container, said second measuring means disposed for receiving fluid from said first storing means and having at least a top and a bottom and one side wall;
   c) a fluid exit means through which fluid can flow from said second measuring means out of said container;
   d) an air vent means through which air can flow into said container to facilitate venting;
   e) at least one outer container side wall and at least one outer container bottom wall;
   f) a first draw feature formed in at least one of the outer container side walls, said draw feature extending inwardly from said outer container side wall so as to define a separation between said first storage means and said second measuring means;
   g) wherein said container is formed of a single piece of integrally molded material.

15. The container of claim 14 wherein said first storage means is located above said second storage means.

16. The container of claim 15 wherein said first storing means is defined by a bottom with an aperture therein through which fluid can flow from said first storing means to said second measuring means.

17. The container of claim 14 further comprising a top opening located adjacent said first storage means, said top opening in fluid communication with said fluid exit means and said air vent means.

18. The container of claim 14 wherein said first storage means has an opening in said top portion.

19. A container for pre-measuring an amount of liquid poured from said container, said container comprising a substantially enclosed exterior wall, a single dispensing opening in said exterior wall and a first internal storage chamber formed within said substantially enclosed exterior wall, said internal storage chamber having a top portion, a side portion and a bottom portion, said internal storage chamber disposed within said substantially enclosed exterior wall so as to form a second measuring chamber adjacent said bottom portion of said first chamber and at least one annulus formed between said exterior wall and said storage side portion, said annulus extending from said second chamber to said dispensing opening, wherein the bottom portion of said internal storage chamber is provided with an aperture there-through in fluid communication with the second chamber, wherein a first draw feature is formed in said exterior wall, said draw feature extending inwardly from said exterior wall so as to define a separation between said first storage means and said second measuring means, and wherein said container is formed of a single piece of integrally molded material.

20. The container of claim 19, wherein two channels are formed in the annulus between said exterior wall and said storage side portion.

21. The container of claim 20, wherein said aperture in fluid communication with said second chamber opens into said channels adjacent the juncture of said channel and said second chamber.

22. The container of claim 1 further comprising a vent for said storage chamber.

23. A container comprising:
   (a) a storage chamber for receiving and storing a volume of fluid, said storage chamber having a top portion and a bottom, said bottom having an opening therein;
   (b) a measuring chamber for measuring a specific volume of fluid to be dispensed from said container, said storage chamber being in fluid communication with said measuring chamber via said opening through which fluid exits said storage chamber;
   (c) at least one fluid conduit in fluid communication between an exterior opening of said container and said measuring chamber;
   (d) at least one exterior wall; and
   (e) a draw feature formed in said exterior wall, said draw feature extending inwardly from said exterior wall so as to define a separation between said storage chamber and said measuring chamber.

24. The container of claim 23 wherein said storage chamber, said measuring chamber, said conduit and said draw feature are formed of a single piece of integrally molded material.

* * * * *